United States Patent
Grinsted et al.

(10) Patent No.: US 6,731,018 B1
(45) Date of Patent: May 4, 2004

(54) WATER GENERATOR OSCILLATING DUE TO RAPID FLOW OF FLUID

(75) Inventors: Timothy William Grinsted, Stocksfield (GB); Michael John Watchorn, High Mickley Stocksfield (GB)

(73) Assignee: The Engineering Business Limited (GB)

( * ) Notice: Subject to any disclaimer, the term of this patent is extended or adjusted under 35 U.S.C. 154(b) by 0 days.

(21) Appl. No.: 09/622,924

(22) PCT Filed: Mar. 5, 1999

(86) PCT No.: PCT/GB99/00573

§ 371 (c)(1),
(2), (4) Date: Oct. 26, 2000

(87) PCT Pub. No.: WO99/45268

PCT Pub. Date: Sep. 10, 1999

(30) Foreign Application Priority Data

Mar. 7, 1998 (GB) ............................................. 9804770

(51) Int. Cl.[7] .......................... F03B 13/10; F03B 13/00; F03B 13/12; H02P 9/04
(52) U.S. Cl. ............................. 290/42; 290/43; 290/53; 290/54
(58) Field of Search .............................. 290/53, 54, 42, 290/44, 43; 416/79, 83, 1, 64; 417/331

(56) References Cited

U.S. PATENT DOCUMENTS

| | | | | |
|---|---|---|---|---|
| 3,783,302 A | * | 1/1974 | Woodbridge | 290/42 |
| 4,049,300 A | * | 9/1977 | Schneider | 290/54 |
| 4,196,591 A | * | 4/1980 | Wallace | 417/332 |
| 4,208,875 A | * | 6/1980 | Tsubota | 417/331 |
| 4,210,821 A | * | 7/1980 | Cockerell | 290/53 |
| 4,264,233 A | * | 4/1981 | McCambridge | 405/26 |
| 4,347,036 A | * | 8/1982 | Arnold | 416/1 |
| 4,883,411 A | * | 11/1989 | Windle | 417/331 |
| 6,023,105 A | * | 2/2000 | Youssef | 290/44 |
| 6,072,245 A | * | 6/2000 | Ockels | 290/44 |
| 6,109,029 A | * | 8/2000 | Vowles et al. | 270/42 |
| 6,216,455 B1 | * | 4/2001 | Doleh et al. | 290/53 |
| 6,273,680 B1 | * | 8/2001 | Arnold | 416/1 |
| 6,323,563 B1 | * | 11/2001 | Kallenberg, Jr. | 290/42 |

FOREIGN PATENT DOCUMENTS

| | | |
|---|---|---|
| DE | 34 25 426 | 1/1986 |
| WO | 80 01674 | 8/1980 |
| WO | 87 04401 | 7/1987 |

* cited by examiner

Primary Examiner—Burton S. Mullins
Assistant Examiner—Julio Gonzalez
(74) Attorney, Agent, or Firm—Rothwell, Figg, Ernst & Manbeck

(57) ABSTRACT

A prime mover for extracting power from moving water is described comprising a body which is caused to oscillate in water by reversing the direction of thrust generated by at least one submerged control member e.g. a hydroplane or rotating cylinder protruding from a side of the body. Preferably, the prime mover comprises an open bottomed tank which when it oscillates alternately compresses and decompresses a fluid inside it between a closed top of the tank and the water surface. Preferably the fluid is air. Other energy removal schemes can be combined with the prime mover to generate power.

3 Claims, 13 Drawing Sheets

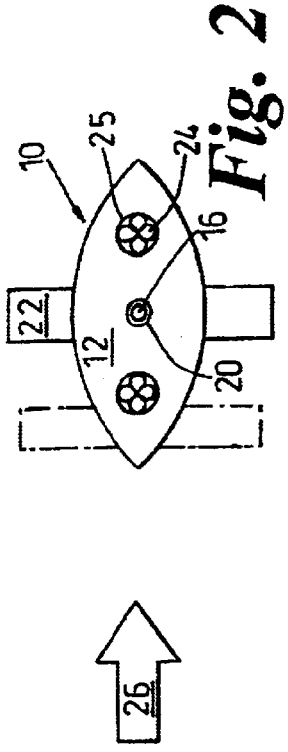
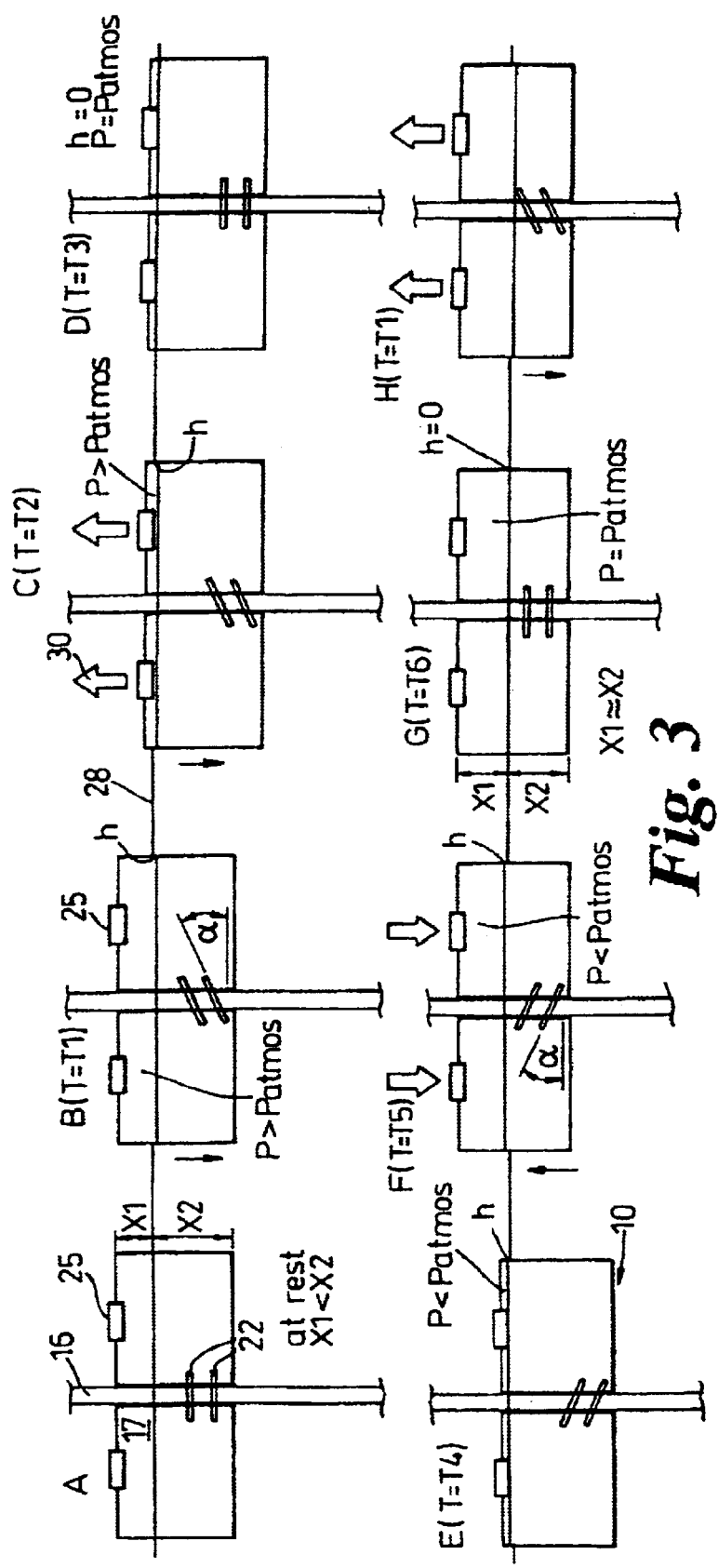

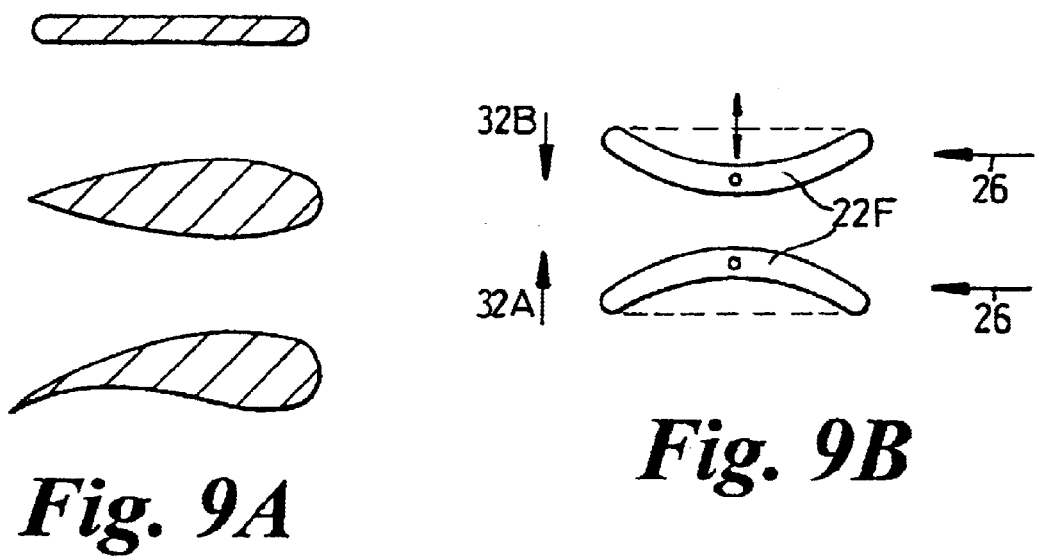
Fig. 9A
Fig. 9B
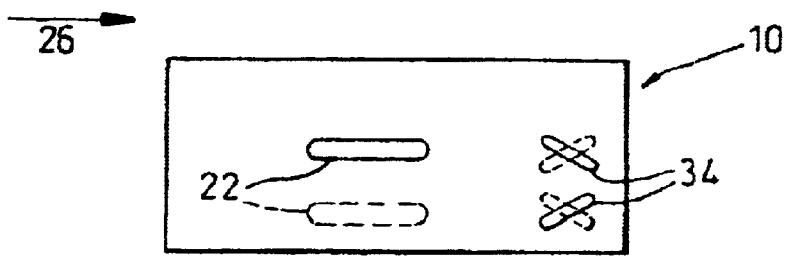
Fig. 10
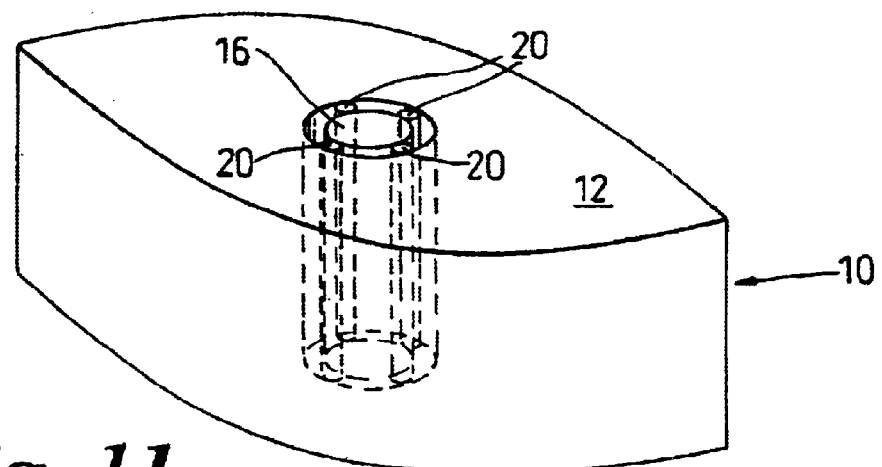
Fig. 11

Reverse Rotation to Reverse Force Direction

WATER GENERATOR OSCILLATING DUE TO RAPID FLOW OF FLUID

BACKGROUND OF THE INVENTION

This invention relates to a prime mover, an apparatus and method for extracting power from moving water such as tidal flows and river currents.

Hitherto, this has generally been proposed or achieved by means of turbines analogous to underwater windmills. The blades of these windmills rotate as a result of the water flow about a horizontal or vertical axis at low speeds of the order of 10 to 30 revolutions per minute and at high torque. Gearboxes are required to transfer rotation at such speeds to the high speeds required for electrical generators. The gearboxes are large, complex and expensive with high power losses. The gearboxes also suffer from reliability problems and are difficult to maintain, particularly when located under water.

GB1604372 discloses a device for utilising tidal energy which comprises two cylindrical tank members fitting slidably inside one another. The device is supported on a tripod resting on the seabed. A flotation collar renders the outer tank buoyant so that it rises and falls with the water level as a result of which air within the tanks is compressed by their relative movement. Connections provided in the cover of the inner tank allow the compressed air to be used to drive an air turbine situated at a remote location.

The current invention aims to provide a prime mover (for converting natural energy into mechanical power), an apparatus and a method for transferring kinetic energy from slow moving water. The prime mover can be used with any suitable energy removal scheme. For example it can be used to produce electrical energy directly or to provide a useful form of mechanical movement. In a further aspect of the invention, kinetic energy from slow moving water is transferred into kinetic energy of a fluid travelling at high speed. Preferably the fluid is air.

According to a first aspect of the invention there is provided a prime mover for extracting power from moving water comprising a body which is caused to oscillate relative to the water by reversing the direction of thrust generated by at least one submerged control member protruding from a side of the body.

Whilst this prime mover is ideally suited for extracting energy from flowing water, extraction from other flowing fluids is possible and the term "water" should be interpreted as covering other flowing liquids and gases throughout this document.

Preferably, at least one control member protrudes from each side of the body.

Preferably, the shape of the body is such that water is caused to travel faster over a portion of the surface of the body and in which one or more protruding control members are positioned at that portion of the surface of the body.

Preferably, the body comprises curved sides which orientate the body with respect to a flow of water so that the control member or members are substantially perpendicular to the direction of flow of the moving water.

Preferably, the control member(s) is generally planar.

Preferably, the shape of the sides is symmetrical.

Preferably, the sides of the body are convex.

Preferably, at least one second protruding control member is provided fixed with respect to the body and arranged so that when the direction of thrust of a first reversible protruding control member is reversed, the angle of the second fixed control member with respect to the flow of water is altered so that the action of the water on that second fixed member. Thus the control member acts like a tail plane of an aircraft.

Preferably, the fixed second control member is positioned at a point on the body at which the velocity of the water flowing past the body is at or near a maximum.

Preferably, the first reversible control member is spaced laterally from it in the direction of the water flow. Preferably, the reversible control member is downstream of the fixed control member. This is much like a tail plane on an aircraft.

Preferably, one or more control members comprise hydroplanes whereby the direction of thrust is reversed by reversing the angle of inclination of at least one hydroplane.

Preferably, the distribution of control members on opposing sides of the body is symmetrical.

Preferably, the body is elongate and tends to orientate itself so that it is elongate in the direction of flow of the current.

Preferably, the body oscillates in a vertical direction.

Preferably, one or more reversible controls members are pivotable in its entirety.

Preferably, one or more reversible control member are pivotable about an edge protruding from the body.

Preferably, one or more reversible control members are pivotable about a central axis protruding from the body.

Preferably, one or more of the reversible control members are formed by a pivotable flap mounted to a control member or other mounting means fixed with respect to the body.

Preferably, one or more reversible control members have an aerofoil shape.

In a further embodiment, one or more control members comprise a rotatable cylindrical structure whose direction of rotation can be reversed to generate a change in direction of thrust. As an example, the cylindrical structure may form a continuous cylinder or may have spaced vanes.

Preferably, more than one control member is provided on opposing sides of the body.

Preferably, the control members are spaced along the body in a direction substantially perpendicular to the direction of flow of the water when the body is orientated so that its control members protrude from the body in a direction substantially perpendicular to the direction of flow of water.

Preferably, the body is arranged to oscillate vertically and two or more control members are provided on opposing sides of the body spaced in a substantially vertical line.

Preferably, three or more control members are provided on each side and the separation of the control members is substantially equal.

According to a further aspect there is provided, apparatus for extracting power from moving water comprising a prime mover as described herein.

Preferably, the prime mover is connected to mooring means secured or securable under water.

Preferably, the prime mover is connected to mooring cable.

Preferably, the prime mover is axially slidably mounted or mountable to a column secured or securable under water in an upright position.

Preferably, the prime mover comprises a downwardly extending tube which surrounds the column.

Preferably, power conversion means are provided for converting the oscillations of the prime mover into another form of power such as electrical power.

Preferably, the prime mover is submerged when generating power.

Preferably, power conversion means are provided comprising one or more hydraulic pumps, a crank for generating mechanical rotation or means for generating electricity such as an electric coil and magnet.

Preferably, power conversion means are provided comprising a fluid pump for pumping fluid to a higher level.

Preferably, the apparatus is moored to or mounted on a structure such as column on which apparatus for extracting power from wind or wave is mounted. Thus, the prime mover extracts power from tidal or river current flow, and power is also extracted from wind or waves. Whilst the prime mover is ideally suited to extracting power from tidal and river currents, it is also adaptable to be used for extracting power from waves as will be explained below in connection with a preferred embodiment.

Preferably, the prime mover is buoyant. Typically, it will float on the surface with part of its structure below the surface.

Preferably, the prime mover comprises an open bottomed tank which when it oscillates alternately compresses and decompresses a fluid inside it between a closed top of the tank and the water surface.

It will be understood by those skilled in the art from the information disclosed herein that the inventions in this preferred embodiment can operate in two modes.

In the first mode, power is extracted from tidal and river flows in the following way. As water flows past the control member, upward and downward thrust is produced causing the prime mover to move in a plane which crosses the flow direction (typically it is roughly perpendicular). Reversing the control member causes the direction of thrust to be reversed and when this is repeated the prime mover reciprocates generally in the plane.

This reciprocating movement can be converted into a more useful form of energy by an appropriate energy removal arrangement. In this preferred embodiment the prime mover is a tank which alternately compresses and decompresses a fluid.

In the second mode, power is extracted from waves. As waves impinge on the tank, the water level inside it rises and falls relative to the top of the collector. Vertical movement of the tank is damped by the drag of the hydroplanes. This drag can be supplemented, though this is not always necessary, by reversing the control member or members to produce thrust in a direction opposite to the rise and fall of water in the waves. Thus the tank tends to remain stationary relative to a fixed point, the shore or sea bed say, but the fluid inside the tank is alternately compressed and decompressed by the action of the waves.

Preferably, at least one duct in the top of the tank permits the fluid alternately to flow out of and into the tank.

Preferably, the fluid flowing through one or more ducts drives a turbine. Preferably, the turbine is mounted on the tank. Thus, the turbine operates in air when the fluid chosen is air. Preferably, the turbine is directly drivably connected to an electrical generator.

Preferably, the number and/or size of ducts open at any time, or selected to drive a selected turbine at a particular time, can be varied so that the flow of air can be optimized to the efficiency requirements of the turbine.

Preferably, a turbine is housed in a duct. Preferably, a generator, or combined turbine and generator is housed in the duct.

Preferably, the turbine rotates in the same direction irrespective of the flow of fluid out of or into the tank.

Preferably, valve means are provided so that fluid passes through the turbine in the same direction irrespective of the flow of fluid out of or into the tank.

Preferably, the fluid is air.

In a further aspect there is provided a method of extracting power from moving water comprising repeatedly reversing the direction of thrust generated by a submerged control member protruding from a body in a prime mover as described herein.

Preferred embodiments of the invention will now be described, by way of example only, with reference to the accompanying drawings as follows:

FIG. 2 is a plan view of the apparatus of FIG. 1.

FIG. 3 shows eight cross-sectional views (A–H) showing the operating cycle of the apparatus.

FIGS. 9A and 9B shows cross-sectional views through alternative hydroplanes of the apparatus in accordance with the invention.

FIG. 10 is a schematic elevation view of one side of an apparatus according to the invention showing fixed hydroplanes at a central location and rotatable tail hydroplanes located, in this preferred embodiment, towards the rear of the apparatus vis a vis the flow direction of the water.

FIG. 11 is a perspective view of a tank according to the invention showing optional elongated bearings used to mount the tank to a monopile. Spaced ring bearings may also be used as shown in cross section in FIG. 7.

Figure 1:
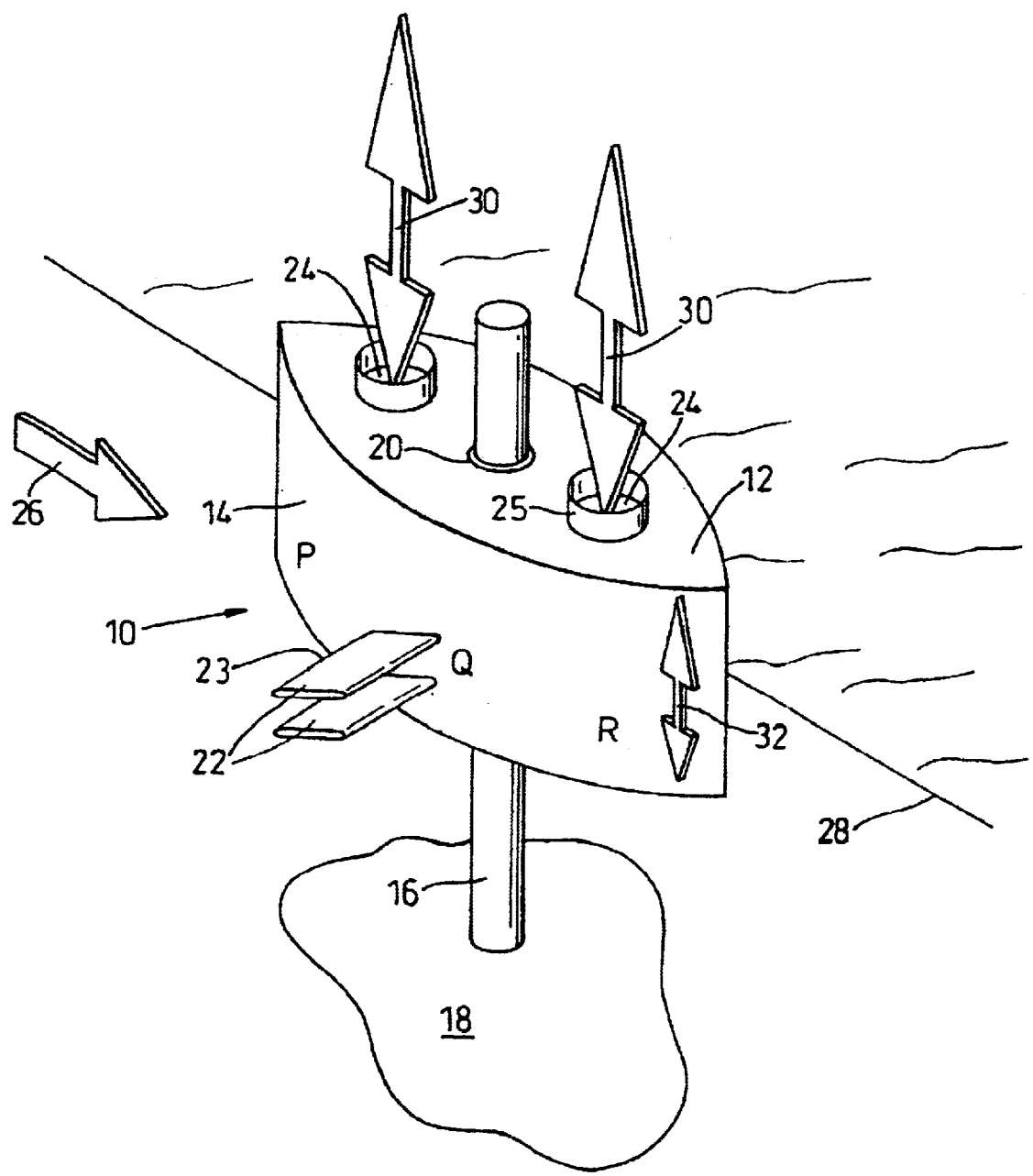
FIG. 1 is a perspective view of an active water column apparatus installed in working position for extracting power from moving water.

In FIG. 1, a large buoyant or floating open bottomed tank 10 contains air as a working fluid (see 17 in FIG. 3). Tank 10 has a substantially flat top 12 and is canoe shaped in plan view. The convex sides 14 of tank 10 meet to provide a pointed edge. The sides serve to orientate the tank so that the pointed edge points into the flow so that water passes over convex sides 14. Thus, water travels over sides 14 between points P, Q and R. At point Q the flow of water is generally homogenous and is typically faster than the flow of water at points P and R because of the constriction produced by the widening of the tank at that point. This is a suitable point at which to place hydroplanes 22 protruding from sides 14, the kinetic of the water energy available to be extracted being proportional to the cube of the velocity of the flow. Therefore the hydroplanes are advantageously located at this point of maximum velocity.

Tank 10 typically comprises a downwardly extending tube (not shown) which slidably surrounds a support column 16 secured underwater, usually to the sea or river bed 18, in an upright position. Typically, a large diameter bearing 20, for example a plane bearing, is secured in the top of the tube and a similar bearing (not shown) is secured in the bottom of the tube so that the two bearings are widely spaced apart. Thus, said bearings are slidable axially and rotateably relative to the column 16. Further bearing strips may be provided as an alternative or in addition to the circular bearings as shown in FIG. 11.

Hydroplanes 22 are submerged and pivotable in their entirety, typically about a lower edge 23, about an axis generally perpendicular to sides 14 of the tank. The two upper hydroplanes 22 on opposite sides 14 of the tank are interconnected by a shaft (not shown) and the two lower hydroplanes are likewise interconnected. The inclination of the hydroplanes 22 is reversible in unison by partially rotating the associated shafts, for example by hydraulic or mechanical means. Such change in the inclination of the hydroplanes is typically under computerised control and in response to several parameters. These parameters include motion of the tank, water flow direction, forces on the hydroplanes and/or air pressure in the tank. As will be explained below, the optimum arrangement is such that air is virtually always flowing into or out of the tank. The energy within the tank at a given time is equivalent to the air pressure times the air volume. The energy available to be collected is equivalent to the volume change over a given time period times the pressure differential over the same period.

Figure 12:
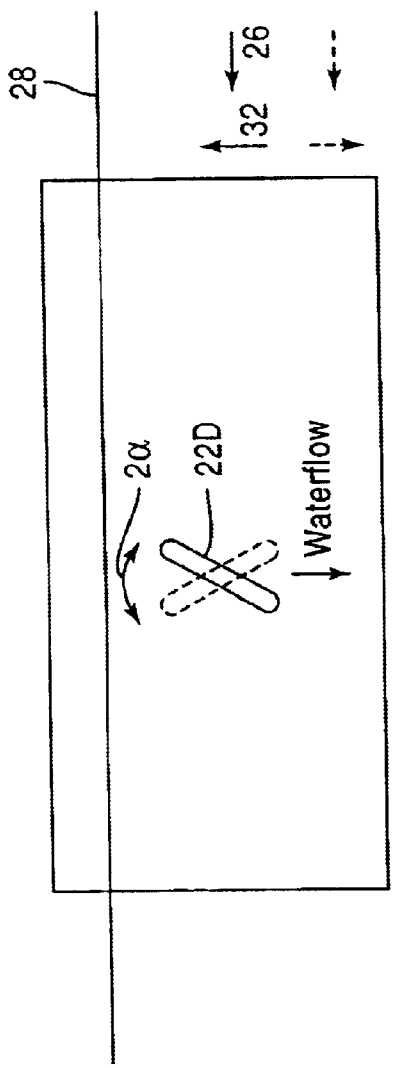
FIG. 12 shows a schematic side view of a tank detailing the use of control members as water reflectors rather than hydroplanes.

The maximum angle of inclination of the hydroplanes 22 is also adjustable. Whilst hydroplanes 22 typically act as hydroplanes causing lift by the action of water flowing over their upper and lower surfaces, control members, for example hydroplanes 22, can be caused to act as water deflectors much in the same way that a kite deflects air. This is shown in FIG. 12 and will be described in further detail later.

Two ducts 25 are formed in the top 12 of tank 10. These ducts house high speed air turbines and, optionally, also generators which are directly drivable by the flow of air into and out of the tank and can supply rotation directly to the electrical generators (not shown) wherever these are located. Turbines 24, and the generators, need not therefore be located underwater but are working in air enhancing reliability, and ease of maintenance. Valve means (not shown) can be provided in each duct so that air passes through each turbine 24 in the same direction irrespective of the flow of air into or out of the tank. Alternatively, a special turbine such a Wells turbine is used, such turbines always turn in the same direction irrespective of the direction of air flow.

In operation, the shape and in particular the convex sides 14 of tank 10 automatically orientate it like a weather vane so that control members, for example hydroplanes 22, are kept substantially at right angles to the water current indicated by arrow 26. This orientation reduces drag on the tank and increases the velocity of the current passing along particularly the widest most portion of the sides and therefore over hydroplanes 22.

The action of water current indicated by arrow 26 on hydroplanes 22 causes the tank to move upwards and downwards on column 16 depending upon the inclination, for the time being, of the hydroplanes. Thus, the tank is caused to oscillate as indicated by arrow 32 so as to alternately compress (as it moves downwards) and decompress (as it moves upwards) the air contained inside it between top 12 and water surface 28.

Figure 4:
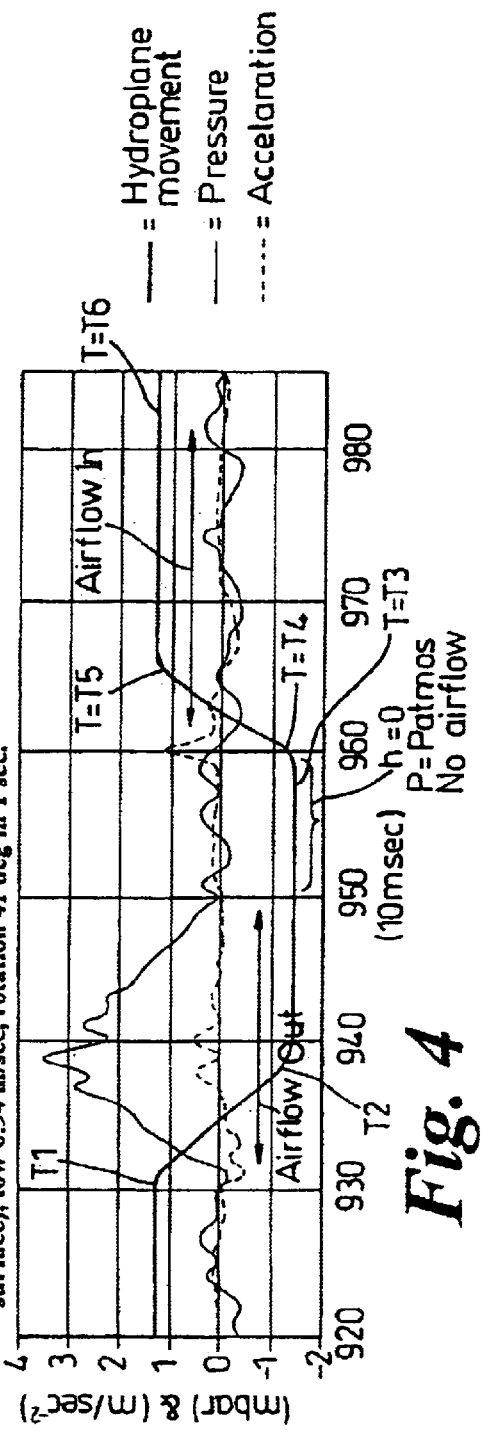
FIG. 4 is a graph showing hydroplane movement, air pressure and hydroplane acceleration as a function of time during the operating cycle.
Figure 5:
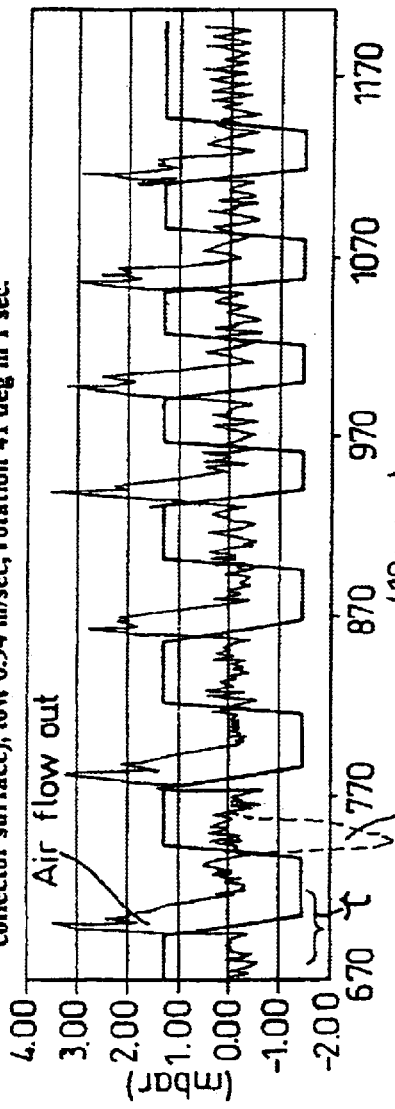
FIG. 5 shows a number of repeated cycles similar to those in FIG. 4.

As tank 10 moves downwards the pressure differential causes air to be expelled through the ducts. During the downward part of the cycle, the downward force from hydroplanes 22 and the weight of the tank opposes the buoyancy forces, ie upthrust of the water on the tank. This can be seen in steps a and b of FIG. 3. The air pressure inside the tank is greater than atmospheric pressure outside and causes a small change h in the level of water inside the tank compared to the level of water outside the tank. This head of water coupled with further downward movement of the tank by virtue of the angle of inclination of the hydroplanes causes the continued pressure differential inside and outside the tank. Air 30 is expelled from the tank via ducts 25. As can be seen in FIGS. 4 and 5, at T=T1 air commences to be expelled from the tank. This continues until T=T3 when the downward forces on the tank are balanced by the upward forces of water, head h of water is lost and the pressure inside the tank equals atmospheric pressure. At this point flow 30 ceases. It is desirable that the length of time spent at this point is kept to a minimum.

Therefore, towards the bottom of the movement and preferably before too long is spent at the bottom of the movement, the inclination of the hydroplanes 22 is caused to reverse so that these exert a vertical upward force. Tank 10 is accelerated upwards by a combination of this force and its buoyancy (see step E in FIG. 3).

As the tank moves upwards, the pressure within it falls below atmospheric and a small head of water h is developed compared to the level of water outside the tank. Air is drawn in through the ducts (see step F). At the top of the movement the head of water h disappears and the pressure inside the tank again reaches atmospheric.

Thus, if the distance of the tank above water surface 28 at rest is X1 and below water surface 28 is X2 then at step G, the top of the motion, X1 has increased in relation to X2.

In the measurements shown in FIG. 4 there is no peak in the pressure measurement to indicate air flowing in to the tank because of the limitation of the measuring equipment. Nevertheless, air was observed to flow into the tank during the period indicated.

The cycle is repeated beginning again with hydroplanes 22 being inclined in the other direction with respect to the current indicated by arrow 26.

The velocity of the air passing through the turbines can be varied by changing the size and/or the number of ducts. Thus, in FIG. 6, of the six ducts shown, one or more of these may be closed off or otherwise removed from the flow of air so that the velocity of air passing through the remaining ducts is increased. Thus the size and/or number of the ducts can be varied so customising a particular apparatus for a particular location (since current flows vary from location to location) or for particular conditions. Indeed, several ducts can be diverted through a single turbine, so that it operates in its most effective range for power generation, when water flow is slow, and rediverted to several ducts (and hence several turbines) when water flow is fast. Typically, the air turbines also comprise a generator located in the ducts. The velocity of air passing through the turbines can also be varied by changing the number and/or size of the hydroplanes. This ability to customise the tank to location and the prevailing conditions allows it to operate at optimum or near optimum efficiency in given circumstances.

Figure 13B:
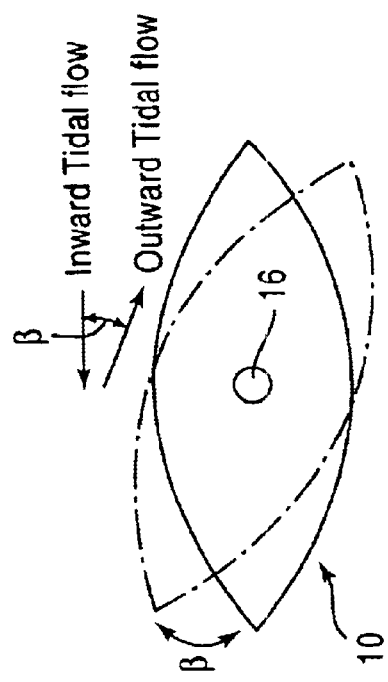
FIGS. 13A and 13B show a plan view of a tank according to invention moored by cables when tidal flow in and out are at 180 degrees and moored by a monopile when tidal flow is at an angle B between inward and outward flows, respectively.
Figure 13A:
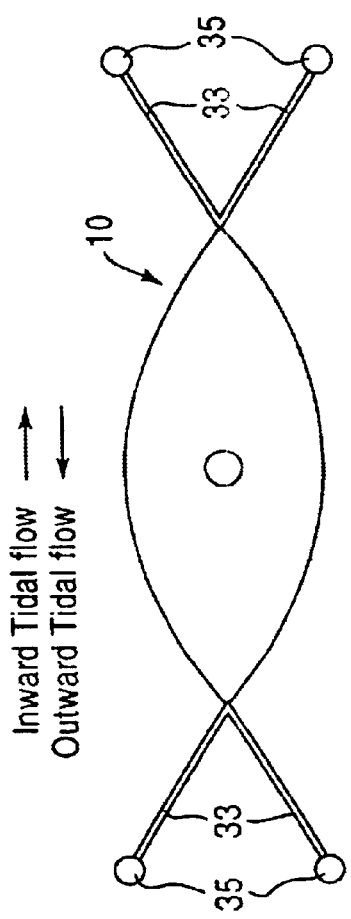

Since the tank 10 floats and is slidable relative to column 16 it is self-adjusting to changes in the height of water surface 28. Furthermore, since it can rotate on column 16, which may be a monopile, it is self-adjusting to changes in the direction of water flow. This can be particularly important for tidal flows where inward and outward tidal flows are not at approximately 180 degrees to each other. This is shown in detail in FIGS. 13A and 13B in which cables 33 can be used to moor tank 10 on monopiles 35 when inward and outward flow are in substantially opposite directions or in river flows. A limited amount of rotation can be possible when using mooring cables if the attachment points of the cables are designed for this. However, a central column 16 or monopile is typically used to mount tank 10 when inward and outward flows are at angle B with respect to one another. This allows rotation of tank 10 by angle B to align itself with the prevailing tidal flow.

The angle of inclination of the hydroplanes relative to the direction and speed of the water current governs the magnitude of lift and drag forces on the tank. Thus, typically control members, for example hyroplanes 22, function as hydroplanes generating lift but little drag. In FIG. 12, water flow indicated by arrow 26 is redirected downwards by control member 22D causing tank 10 to move in the direction of arrow 32. This Is similar to the way that a kite maintains it height. Control member 22D is rotated through a vertical plane about a horizontal axis to cause the tank 10 to reverse its direction of motion. Control members 22D can however cause drag so their use may be limited to particular circumstances where drag is not a problem, such as when firm cable moorings are available.

Adjustment of the angle of hydroplanes or control members 22d such as those in FIG. 12 can allow for maximum power output over a wide range of current speeds. Thus there are several variables as described above which can be optimised to increase the efficiency and power output of the apparatus. Furthermore, the apparatus can be connected to shore by a power cable and can be submersible during storms thereby reducing the risk of damage.

Figure 6:
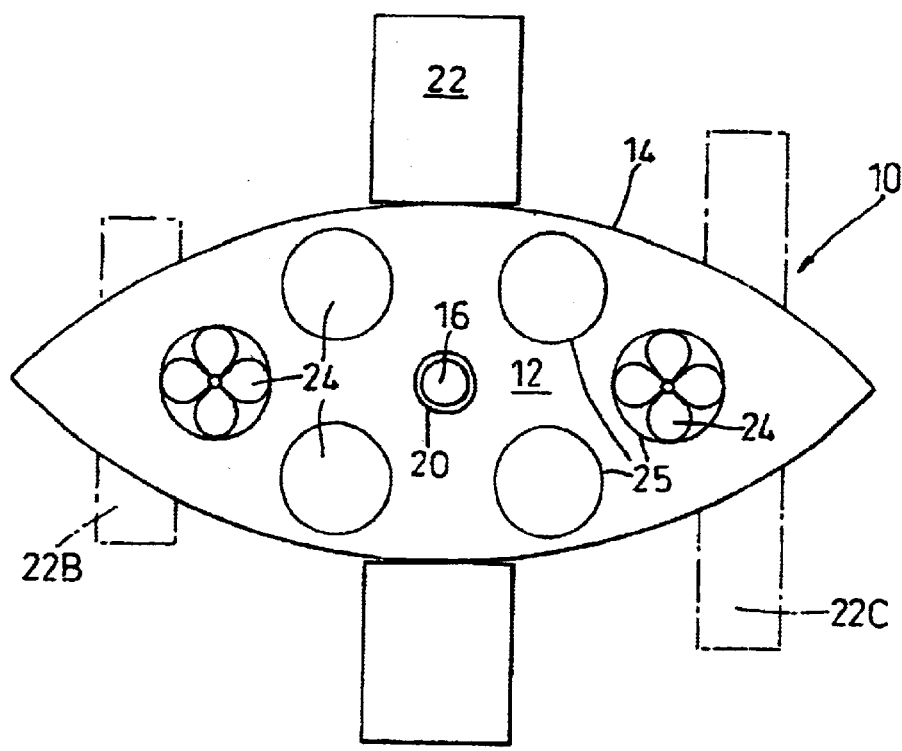
FIG. 6 is a plan view of an alternative embodiment of the invention showing several air exhaust/inlet ducts.

FIG. 6 shows control members 22C and 22B which typically function as hydroplanes operating over an angular range of 5 to 30 degrees, for example, 2α equals around 60 degrees. The frequency with which the planes are reversed is typically 5 to 20 seconds, but may be less than or more than this. The angular orientation of the hydroplanes in a working position is selected from a range of angular working positions.

Hydroplanes or control members 22a are located on the widest portion of tank 10. Alternative or further hydroplanes or control members 22B and 22C can be located at other points though this is less preferred. Hydroplanes or control members 22B are equally spaced whereas hydroplanes or control members 22c are not equally spaced. By locating hydroplanes in a vertical direction, one above the other, roughly perpendicular to the water flow the turbulence flow produced downstream does not interfere with its neighbours. Thus, typically one of the hydroplanes or control members 22A and 22B and 22C, is selected rather than having hydroplanes spaced along the tank in the direction of flow of the water. The hydroplanes may be staggered, i.e. spaced vertically but overlapping in a horizontal direction such as hydroplanes 22E in FIG. 8.

Figure 7:
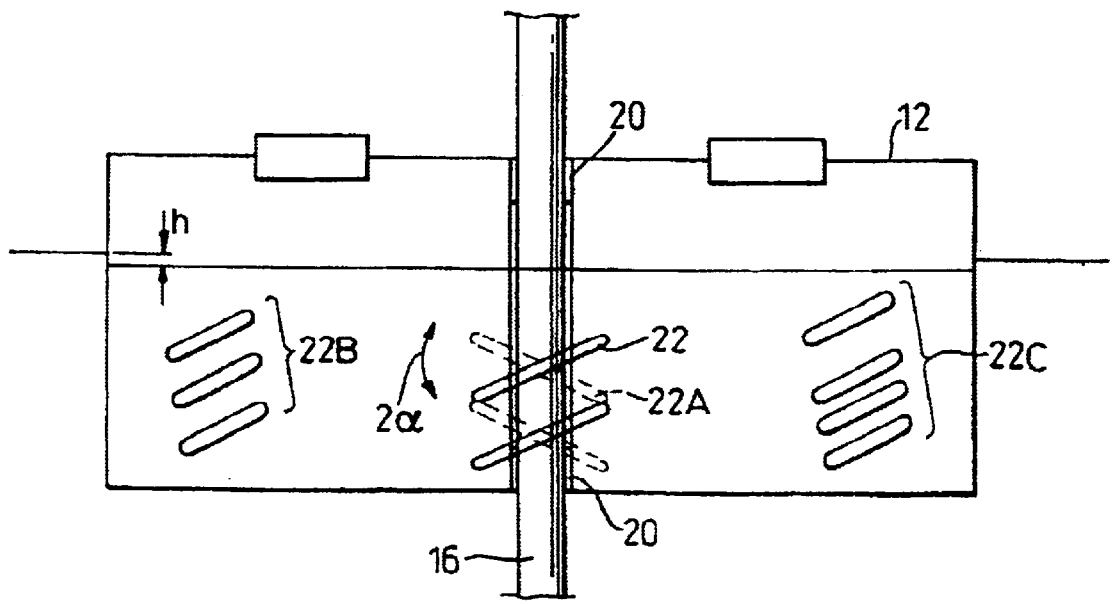
FIG. 7 is a cross-sectional view through the apparatus of FIG. 6 showing its mooring on a monopile.
Figure 8A:
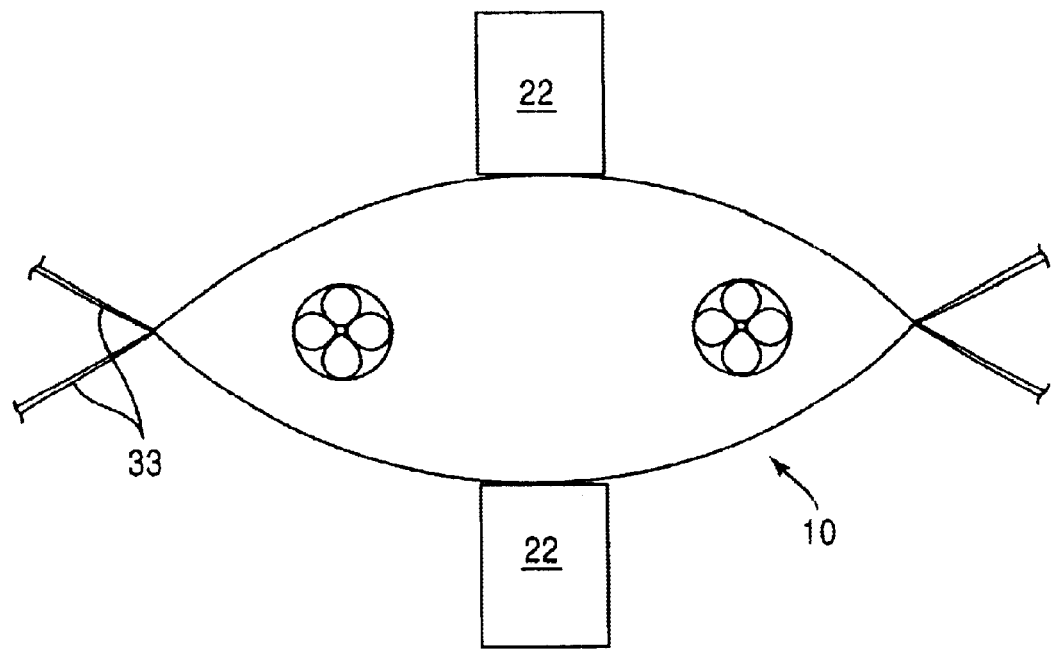
FIGS. 8A and 8B show plain and cross-sectional views of a cable moored apparatus.
Figure 8B:
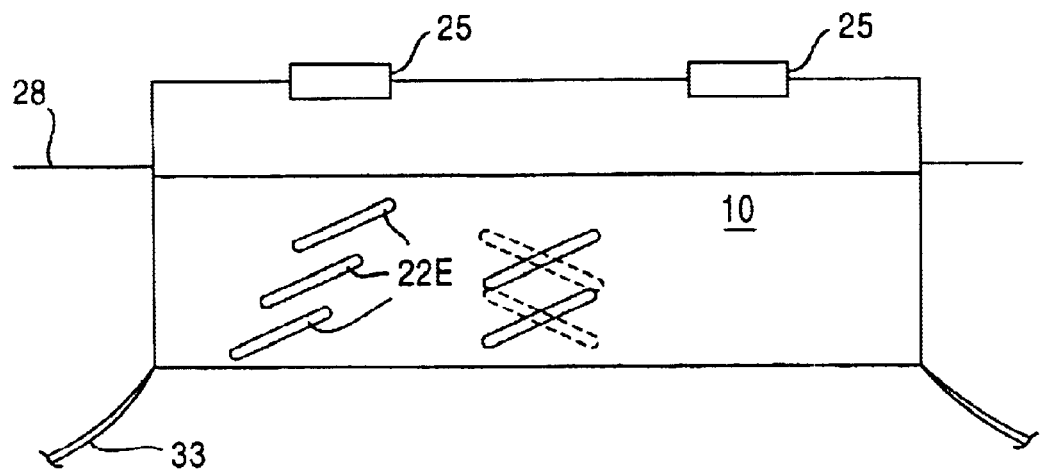

FIGS. 8a and 8b also show a tank similar to that in FIG. 6 and 7 but moored by cables 33 to a suitable mooring point either above or below water level. FIG. 9A shows two symmetrical cross-sections, one more aerodynamic than the other, for use as hydroplanes and one aerofoil cross-section for use as hydroplane. Typically, symmetrical shapes are preferred and aerodynamic shapes are preferred most of all.

FIG. 10 shows fixed hydroplanes 22 which do not rotate with respect to tank 10. Rotatable tail hydroplanes 34 cause the tank to rise or fall. Once this rise has begun, it slightly tilts the tank so that hydroplanes 22 are now at an angle with respect to water flow 26 thus adding to the forces causing the tank to rise or fall. Other hydroplanes, or mounting structures, fixed with respect to the tank on which reversible hydroplanes are mounted may be used. These resemble pivotal flaps on aeroplane wings. A further type of hydroplane suitable for use with the invention is shown in FIG. 9B. Here, hydroplane 22F shown in cross section is flexible and can be flexed so that its curvature is inverted (reversed) causing lift 32A or downward thrust 32D as appropriate.

FIGS. 14A–B, 15A–B, 16A–B, 17 and 18 show the use of a prime mover 40 mounted about a column 16 or moored via cables 33 and provided with hydroplanes 22 causing prime mover 40 to rise or fall on the reverse of these hydroplanes. Several different kinds of power conversion means are provided for converting the oscillating motion of prime mover 40 into usable forms of power, whether this is water stored at a higher level, mechanical rotation, electrical power, hydraulic power and so on. Whist tank 10 is typically buoyant, prime mover 40 is typically partially buoyant so that it is submerged when at rest. Prime mover 40 rises and falls in exactly the same way as tank 10 by reversing the inclination of hydroplanes 22 or control members 22D as previously described. Thus, prime mover 40 oscillates up and down in the direction of arrow 32.

Figure 14A:
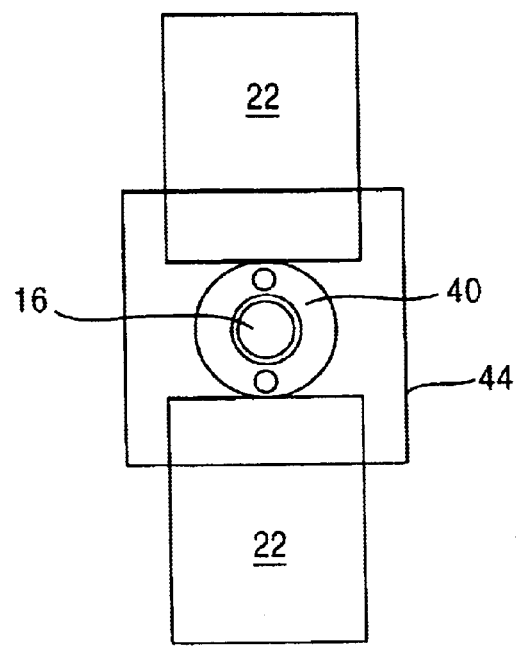
FIGS. 14A and 14B show plain and cross-sectional views of an apparatus for generating power from a prime mover according to the invention using a hydraulic cylinder when moored to a monopile support column.
Figure 14B:
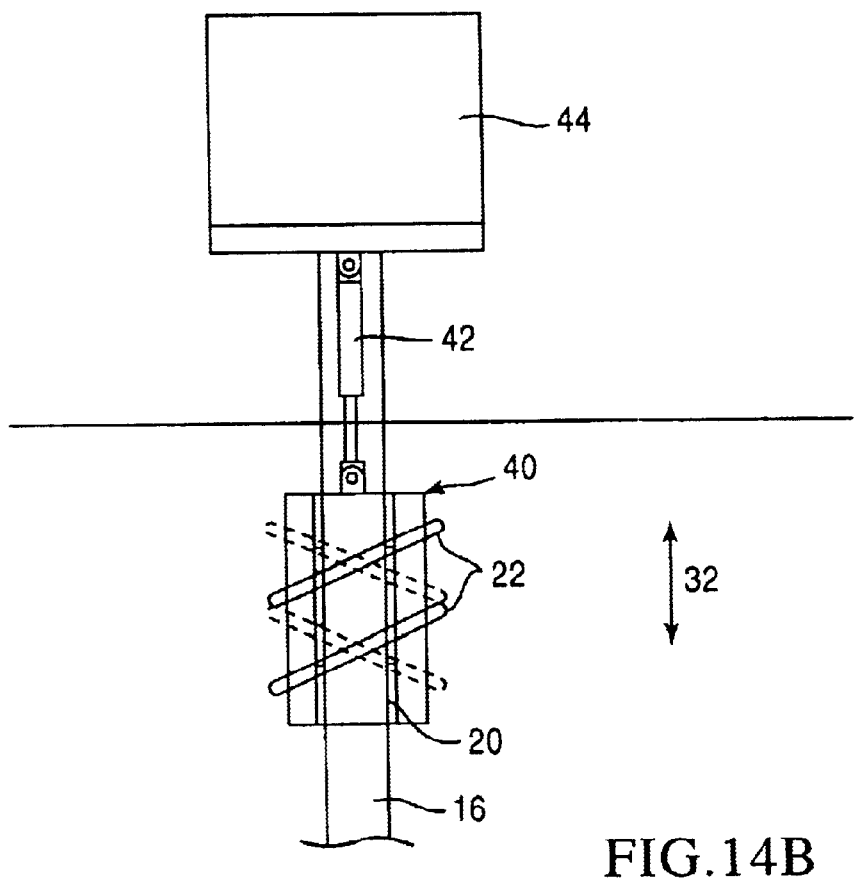

In FIGS. 14a and 14b, a hydraulic piston pumps fluid within a control chamber 44 to generate power or connects to a crank.

Figure 15A:
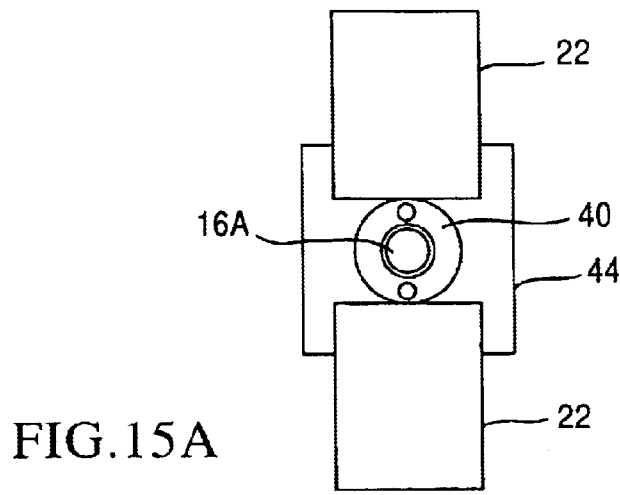
FIGS. 15A and 15B are similar to FIGS. 14A and 14B, but a control/generating box is floating beneath the surface and moored by cables.
Figure 15B:
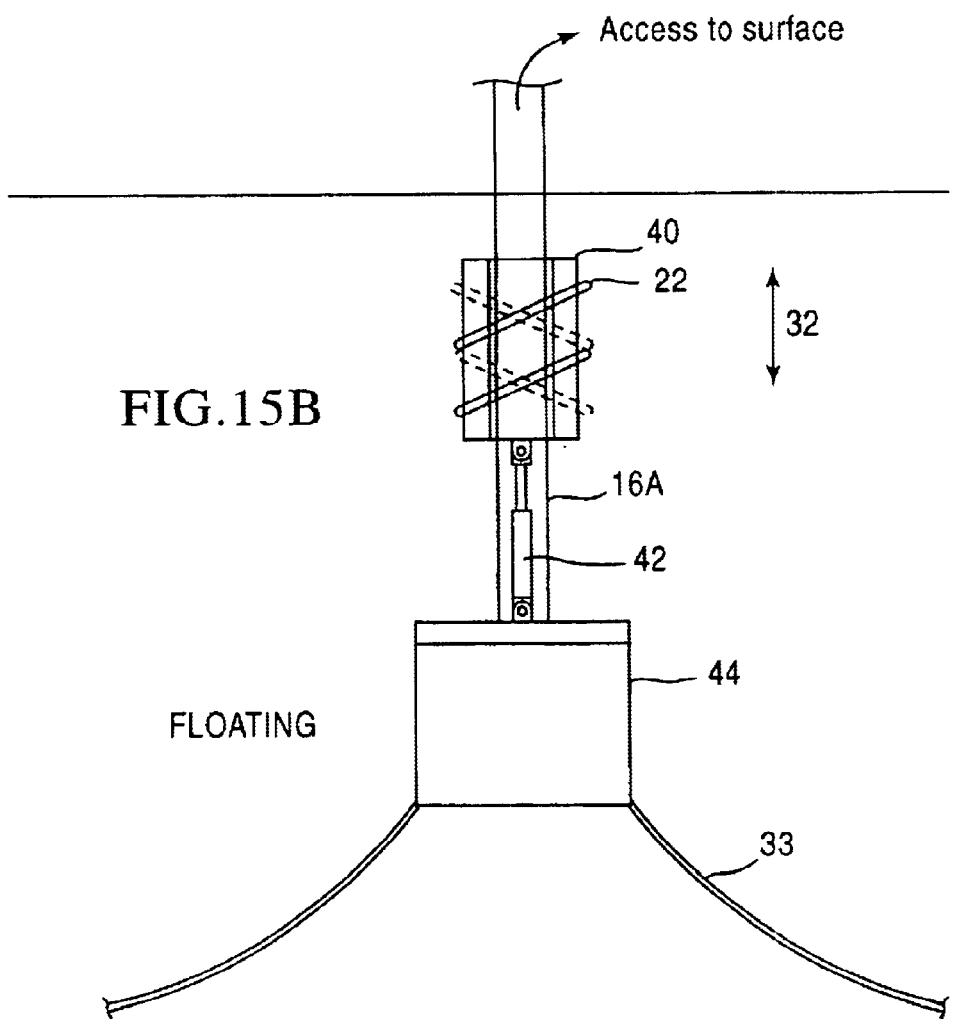

In FIGS. 15a and 15b, a similar hydraulic pump 42 is used though in this case control chamber 44 is located beneath the surface and is moored to the sea bed by cables 33. Thus, the prime mover 40 here floats above the sea bed. Typically column 16A, about which prime mover 40 is located, comprises slots through which members mounted on prime mover 40 project to drive pump 42 so causing the piston in hydraulic apparatus 42 to rise and fall. Also column 16A is open to the surface to permit access to the control chamber 44 and so that power can be extracted for example by cables.

Figure 16A:
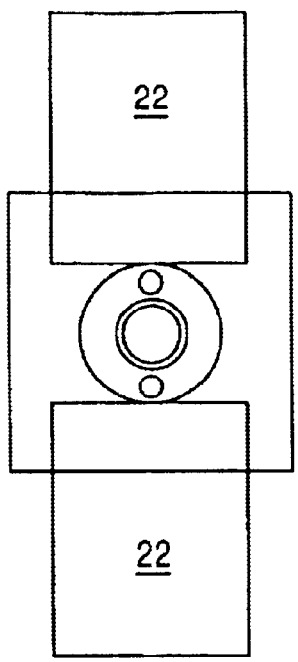
FIGS. 16A and 16B show plain and cross-sectional views of an apparatus for generating mechanical power from a submerged prime mover moored on a monopile support column. The apparatus can be rearranged in a similar manner to that of FIGS. 15A&B, ie. utilising a control/generating box submerged and moored by a cable.
Figure 16B:
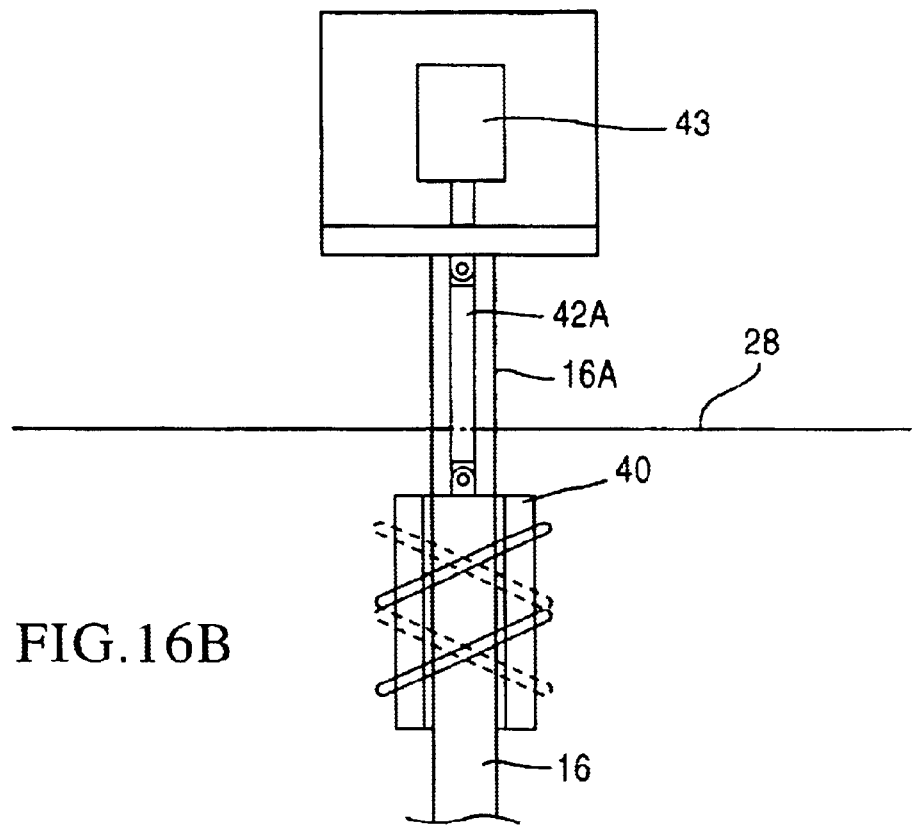

In FIGS. 16a–16b, shaft 42a rises and falls causing a crank system 43 to generate mechanical rotation which can be converted into electrical power or caused to drive a turbine.

Figure 17:
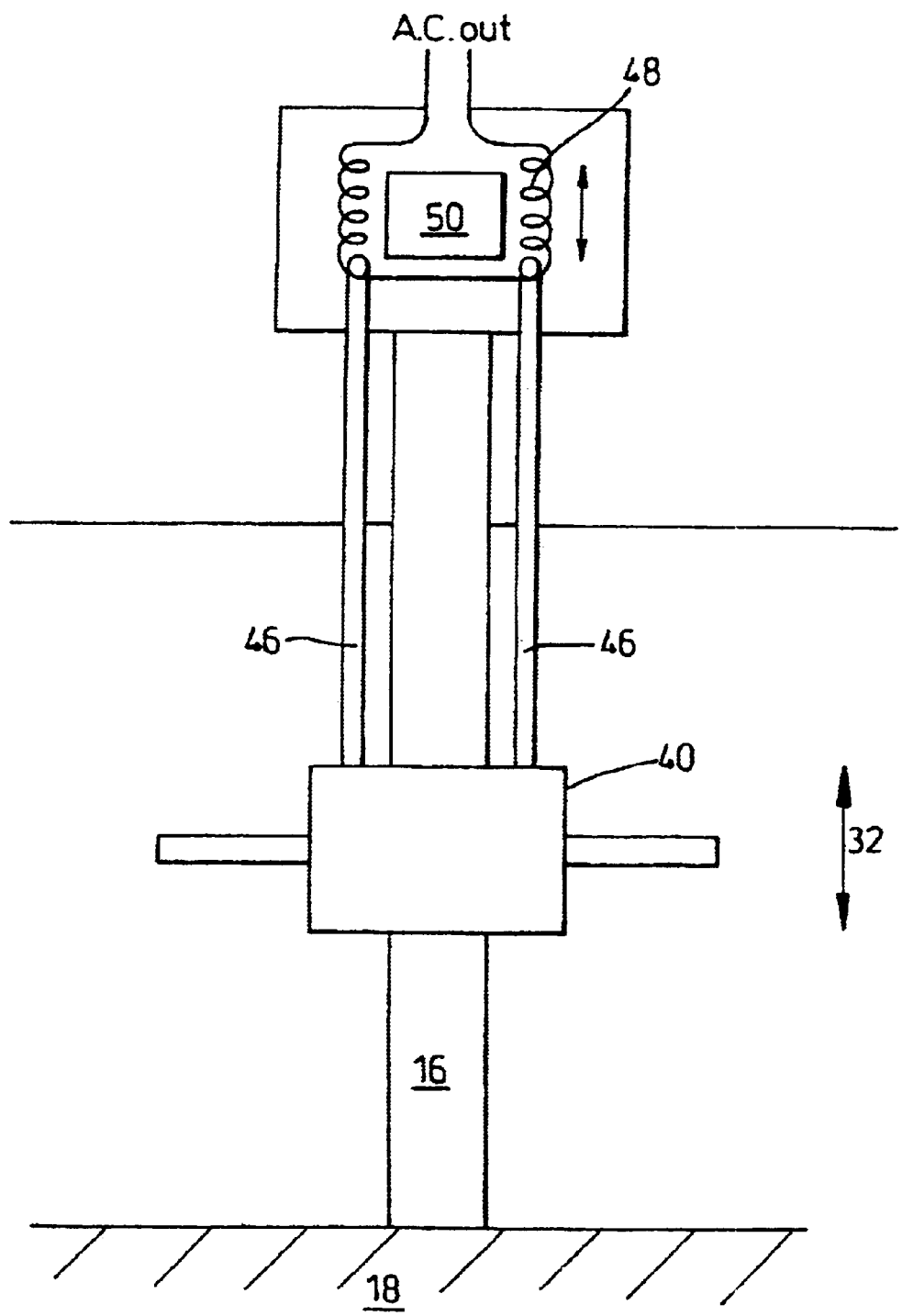
FIG. 17 shows a schematic elevation view of apparatus for generating electricity directly using a prime mover.

In FIG. 17 struts 46 carry a coil 48 and move up and down in the direction of arrow 32 along with prime mover 40. Coil 48 is positioned about a magnet 50 to provide directly an ac current directly.

Figure 18:
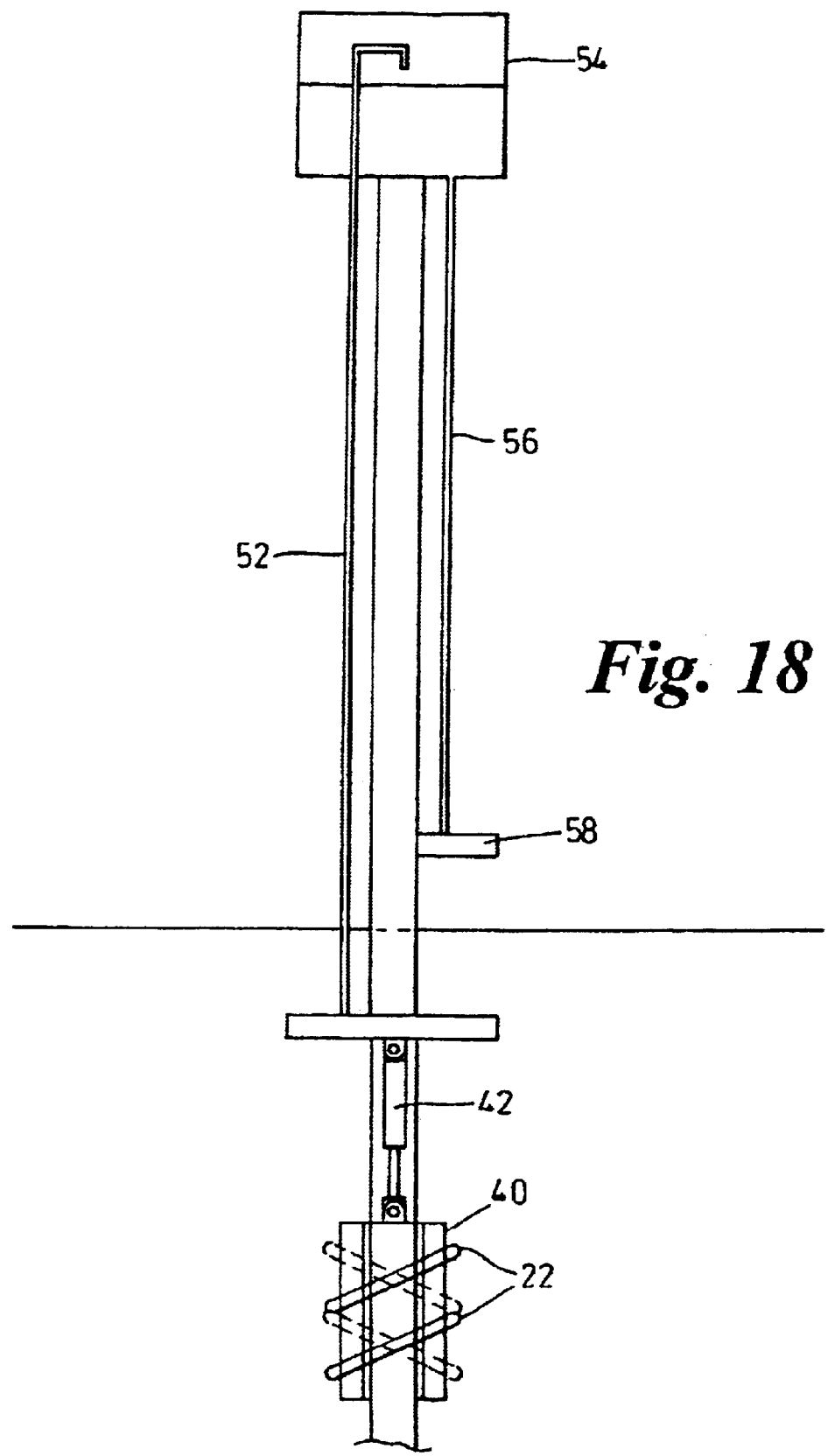
FIG. 18 shows a schematic elevation view of apparatus for pumping water to a higher level for storage of potential energy. Typically, the water is the same as that flowing past the tank 10.

In FIG. 18, water is pumped by hydraulic apparatus 42 and pipe 52 into an elevated storage chamber 54. The water falls back via pipe 56 and can be used to generate electrical power in water turbine 58.

Figure 19:
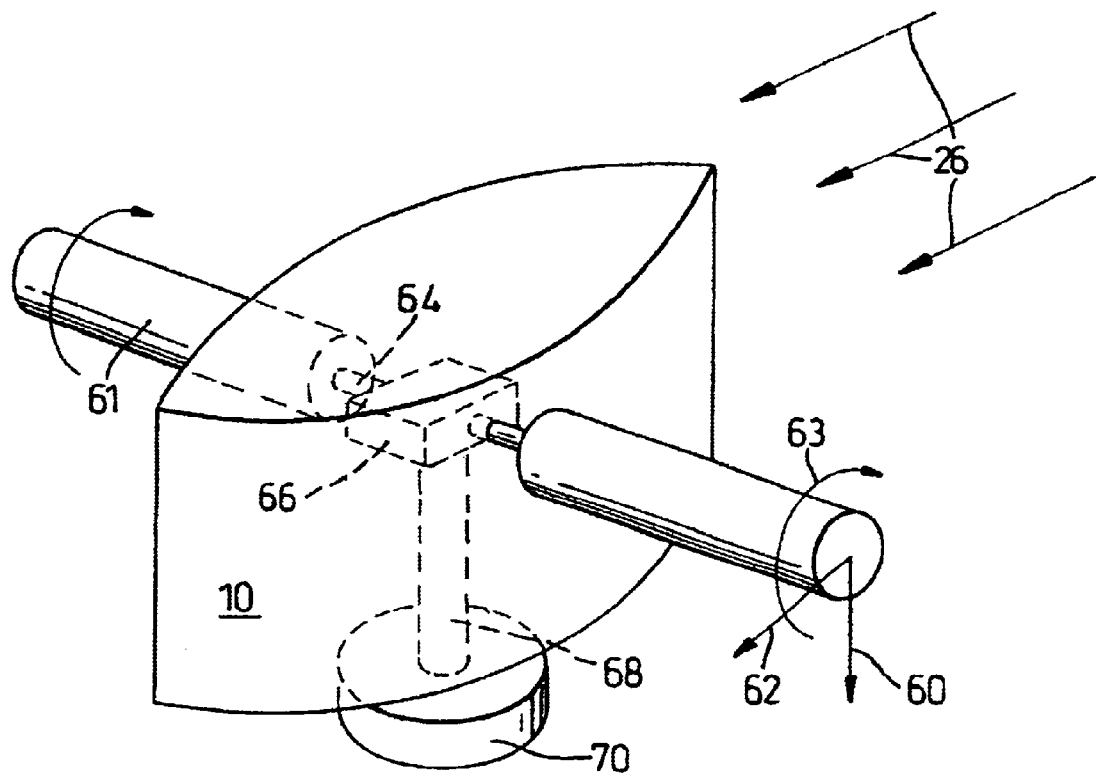
FIG. 19 shows a schematic perspective view of an alternative tank in accordance with the invention.

In FIG. 19, an alternative embodiment uses rotating cylinders to generate upward and downward thrust. Cylinders 61 rotate in the direction of arrow 63 with respect to current 26. The cylinders produce drag 62 but also a downward force 60, or an upward force when rotation is reversed. Whilst rotation may be produced by driving connecting rod 64 using electricity, current 26 may be used to provide the necessary rotation via rotating wheel 70 which via connecting means 68 and gear box 66 causes rod 64 to rotate. A windmill type wheel rotating about a horizontal axis (not shown) could also be used. The gear box could be used to produce the reversal in rotation 63 without changing the direction of motion of rotating wheel 70.

Thus, the invention provides not only an apparatus for converting slow moving water or other suitable fluids (both gases and liquids) into fast moving air so that rotational speeds of 1,000 to 3,000 revolutions per minute in turbines can be generated, but also prime movers which can be combined with any appropriate energy removal system. Suitable liquids or other gases can be used in place of air. The fast moving fluid is typically lighter than the fluid from which power is extracted. The tank can be non-buoyant or of neutral buoyancy. The tank or prime mover can be orientated by power driven means instead of like a weather vane. One or more rudders or other vertical control surfaces may be provided to aid the orientation of the tank. These may be power driven but could be manually set for example on each tide change. The tank and the prime mover can be located permanently under water. The tank can have a shape different from that shown. A single tank or several tanks may be used.

The apparatus can be used to provide power for an associated desalination plant. One further arrangement is for a combined apparatus responsive to tidal flows, waves and windpower is provide. For example, a wind turbine mounted on top of a support column could be used. Thus power generation is derivable from the action of wave energy on the prime mover, especially when the prime mover is a tank, tidal flows on the prime mover and wind power from the wind turbine mounted on top of the support column. Power generation is possible from the action of waves on one of the control surfaces providing resistance to the bobbing motion of the tank under the influence of the waves. Power generation from waves incident on the semi buoyant collector cause the water inside the collector level to rise and fall relative to the top of the collector. Vertical movement of the collector is damped by the drag of the hydroplanes. The force of the moving water in the wave cycle pushing against the hydroplanes can cause the collector to move in opposite phase to the water inside the collector so causing the fluid in it to be alternately compressed and decompressed. The angle of the hydroplanes can be altered to increase this effect of the waves passing into the collector. The apparatus can incorporate means for storage of energy or can be used to provide power for an autonomous device such as a buoy. A further embodiment may include two prime movers such as tanks 10 with one or more hydroplanes extending between the prime movers. This offers stability to the hydroplanes since both ends of each hydroplane are supported by the tanks.

Control members in the form of hydroplanes and rotating cylindrical structures (whether hollow, solid or vanes spaces about roughly cylindrical periphery and so on) can be used in combination on a prime mover of the invention. The prime mover may be arranged to oscillate horizontally. The angle of inclination, need not be the same for the upward and downward parts of this cycle (eg to take account of the weight of the prime mover).

What is claimed is:

1. A prime mover adapted for submersion in a current of water for extracting power from the current of water comprising:
    (a) a body;
    (b) first and second hydroplanes mounted on the body and extending from respective sides thereof, the angle of inclination of the hydroplanes with respect to said current flow being operatively changeable by rotation of the hydroplanes in unison about a common axis which axis passes through the body and which axis is substantially perpendicular to the direction of flow of the current, the hydroplanes being operatively rotatable in unison about said axis between:
        (i) first positions in which the angle of inclination is such that the action of the current on the hydroplanes is effective to generate thrust in a first direction and thereby to move the body in said first direction and
        (ii) second positions in which the angle of inclination is such that the action of the current on the hydroplanes is effective to generate thrust in a second direction opposite to the first direction and thereby to move the body in said second direction;
    (c) means for rotating the hydroplanes from a said first position to a said second position when the body is moving in the first direction and for rotating the hydroplanes from a said second position to a said first position when the body is moving in the second direction thereby causing the body to execute a controlled oscillation; and
    (d) means for extracting power from the oscillatory movement of the body.

2. An apparatus for extracting power from moving water comprising the prime mover according to claim 1.

3. A method for extracting power from a current of water using a prime mover as claimed in claim 1, comprising:
    submersing said body in said current of water; and
    periodically reversing the direction of thrust generated by the said hydroplane, by operating said means for rotating the hydroplanes.

* * * * *